United States Patent
Toda et al.

(10) Patent No.: US 8,384,284 B2
(45) Date of Patent: Feb. 26, 2013

(54) PHOSPHORS HAVING HIGH LIGHT EMISSION LUMINESCENCE

(75) Inventors: Kenji Toda, Niigata (JP); Kazuyoshi Uematsu, Niigata (JP); Mineo Sato, Niigata (JP); Tetsu Umeda, Ushiku (JP); Yutaka Ito, Tsukuba (JP)

(73) Assignees: Niigata University, Niigata (JP); Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/933,382

(22) PCT Filed: Mar. 18, 2009

(86) PCT No.: PCT/JP2009/055264
§ 371 (c)(1),
(2), (4) Date: Sep. 17, 2010

(87) PCT Pub. No.: WO2009/116563
PCT Pub. Date: Sep. 24, 2009

(65) Prior Publication Data
US 2011/0025194 A1    Feb. 3, 2011

(30) Foreign Application Priority Data
Mar. 19, 2008    (JP) .................... 2008-071107

(51) Int. Cl.
*C09K 11/66* (2006.01)
*C09K 11/54* (2006.01)
*C09K 11/59* (2006.01)
*H01J 1/62* (2006.01)

(52) U.S. Cl. .......... 313/503; 252/301.4 R; 252/301.4 H; 252/301.6 R

(58) Field of Classification Search .......... 313/500–512; 252/301.4 F, 301.4 R, 301.4 P, 301.4 H, 301.6 R; 257/98
See application file for complete search history.

(56) References Cited

U.S. PATENT DOCUMENTS
2006/0065900 A1    3/2006    Hsieh et al.
(Continued)

FOREIGN PATENT DOCUMENTS
JP    64-6087 A    1/1989
JP    2006-093711 A    4/2006
(Continued)

OTHER PUBLICATIONS

Baoling Wang, et al., "Sol-gel synthesis of single-phase $Ca_5MgSi_3O_{12}$:$Eu^{2+}$,$Mn^{2+}$ phosphors for white-light emitting diodes," Materials Letters, Mar. 13, 2009, pp. 1329-1331, vol. 63.

(Continued)

*Primary Examiner* — Anh Mai
*Assistant Examiner* — Elmito Breval
(74) *Attorney, Agent, or Firm* — Sughrue Mion, PLLC

(57) ABSTRACT

Provided are phosphors that can exhibit higher emission luminance. Phosphors in which the activator is included in a compound represented by Formula $xM^1O.M^2O.yM^3O_2$ (wherein $M^1$ represents one or more of a group comprising Ca, Sr and Ba, $M^2$ represents Mg and/or Zn, $M^3$ represents Si and/or Ge, x is a value in the range 4 to 6 and y is a value in the range 2 to 4). Phosphors represented by Formula $M^1_{5(1-z)}Eu_zM^2M^3{}_3O_{12}$ (wherein $M^1$, $M^2$ and $M^3$ have the same meanings as above, and z is a value in the range 0.0001 to 0.3). The above phosphors have the same crystal structure as bredigite.

8 Claims, 1 Drawing Sheet

U.S. PATENT DOCUMENTS

2007/0235751 A1 10/2007 Radkov et al.
2009/0008673 A1* 1/2009 Kato et al. .................... 257/100
2009/0072255 A1 3/2009 Takahashi et al.

FOREIGN PATENT DOCUMENTS

| JP | 2007-524726 A | 8/2007 |
|----|---------------|--------|
| JP | 2008-050379 A | 3/2008 |

OTHER PUBLICATIONS

Takashi Kunimoto, et al., "Blue emitting Eu activated $CaMgSi_2O_6$ phosphors for VUV excitation," Proceedings of 2000, the Institute of Electronics Information and Communication Engineers (IEICE), Society Conference Speech Articles 2, Sep. 7, 2000, p. 46, C-9-1.

* cited by examiner

US 8,384,284 B2

PHOSPHORS HAVING HIGH LIGHT EMISSION LUMINESCENCE

CROSS REFERENCE TO RELATED APPLICATIONS

This application is a National Stage of International Application No. PCT/JP2009/055264, filed on Mar. 18, 2009, which claims priority from Japanese Patent Application No. 2008-071107, filed on Mar. 19, 2008, the contents of all of which are incorporated herein by reference in their entirety.

TECHNICAL FIELD

The present invention relates to a phosphor.

BACKGROUND ART

A phosphor is used for light-emitting device. Light-emitting device include vacuum ultraviolet ray-excited light-emitting devices (for example, plasma display panel, rare gas lamp, and the like), wherein the excitation source for a phosphor is vacuum ultraviolet rays, and the phosphor is given excitation energy by irradiation of the above excitation source or the like to emit light.

As the conventional phosphor, non-Patent literature 1 discloses a phosphor in which Eu as an activator is contained in a compound represented by $CaMgSi_2O_6$.

Non-Patent literature 1: "Blue light emitting Eu-activated $CaMgSi_2O_6$ phosphor for vacuum ultraviolet ray excitation" by Takashi Kunimoto, Proceedings of 2000, the Institute of Electronics Information and Communication Engineers (IEICE), Society Conference Speech Articles 2, page 46, Sep. 7, 2000

DISCLOSURE OF THE INVENTION

Problem to be Solved by the Invention

The above phosphor do not have sufficient luminance and there is still room for improvement. The purpose of the present invention resides in providing a phosphor that can exhibit higher light emission luminance.

Means for Solving the Problem

The present inventors have devoted themselves to carrying on research in order to solve the above problem and accordingly have completed the present invention.

That is, the present invention provides the following inventions:

<1> A phosphor comprising:
a compound represented by the formula, $xM^1O \cdot M^2O \cdot yM^3O_2$, wherein $M^1$ denotes one or more elements selected from the group consisting of Ca, Sr and Ba, $M^2$ denotes Mg and/or Zn, $M^3$ denotes Si and/or Ge, x is a value in the range of 4 to 6, and y is a value in the range of 2 to 4; and
an activator contained in the compound.

<2> A phosphor comprising:
a compound represented by the formula, $M^1{}_5M^2M^3{}_3O_{12}$, wherein $M^1$, $M^2$, and $M^3$ have the same meanings as above, and
an activator contained in the compound.

<3> The phosphor according to the above <1> or <2>, wherein the activator is Eu.

<4> A phosphor represented by the formula, $M^1{}_{5(1-z)}Eu_zM^2M^3{}_3O_{12}$, wherein $M^1$, $M^2$, and $M^3$ have the same meanings as above, and z is a value in the range of 0.0001 to 0.3.

<5> The phosphor according to any of the above <1> to <4>, which has the same type of crystal structure as that of Bredigite.

<6> A phosphor paste having the phosphor according to any of the above <1> to <5>.

<7> A phosphor layer obtained by coating the phosphor paste according to the above <6> on a substrate and then heat-treating it.

<8> A light-emitting device having the phosphor according to any of the above <1> to <5>.

Advantages of the Invention

The phosphor of the present invention can exhibit higher light emission luminance, and is preferable particularly for vacuum ultraviolet ray-excited light-emitting devices wherein the excitation source for a phosphor is vacuum ultraviolet rays, and for near-ultraviolet ray-excited light-emitting devices (for example, white LED and the like) wherein the excitation source for a phosphor is near-ultraviolet rays (for example, ultraviolet ray to blue light emitted by ultraviolet to blue LED). Furthermore, it can be sufficiently used for light-emitting devices such as electron ray-excited light-emitting devices (for example, CRT, field emission display, surface electric field display, and the like) wherein the excitation source for a phosphor is electron rays, ultraviolet ray-excited light-emitting devices (for example, backlight for liquid crystal display, three band fluorescent lamp, high-load fluorescent lamp, and the like) wherein the excitation source for a phosphor is ultraviolet rays and light-emitting devices (X-rays equipment, and the like) wherein the excitation source for a phosphor is X-rays, and the like. Thus, the present invention is extremely useful industrially.

BEST MODE FOR CARRYING OUT THE INVENTION

Figure 1:
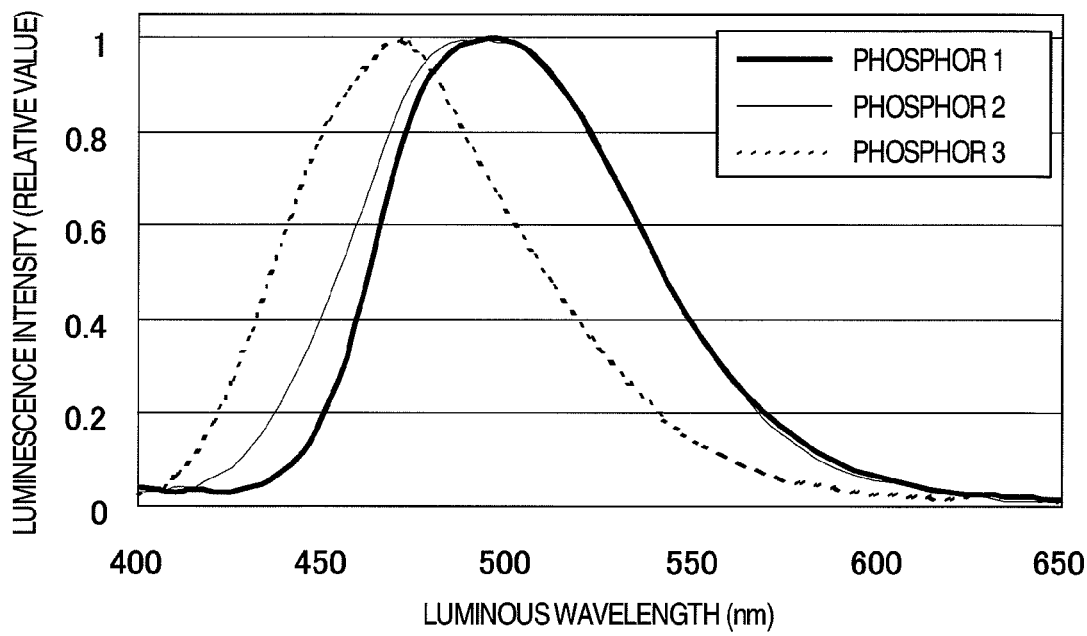
FIG. 1 Emission Spectra in phosphor 1, phosphor 2 and phosphor 3. (The abscissa axis denotes the wavelength of emitted light, and the ordinate axis denotes luminescence intensity (relative value), and the maximum luminescence intensities of the respective phosphors are standardized to 1.)

The present invention is explained as follows.

The phosphor of the present invention is characterized by being formed by comprising an activator contained in a compound represented by the formula, $xM^1O \cdot M^2O \cdot yM^3O_2$, wherein $M^1$ denotes one or more elements selected from the group consisting of Ca, Sr and Ba, $M^2$ denotes Mg and/or Zn, $M^3$ denotes Si and/or Ge, x is a value in the range of 4 to 6, preferably 4.8 to 5.2, and y is a value in the range of 2 to 4, preferably 2.8 to 3.2.

Furthermore, the phosphor of the present invention is formed by comprising an activator contained in a compound represented by the formula, $M^1{}_5M^2M^3{}_3O_{12}$, wherein $M^1$, $M^2$, and $M^3$ have the same meanings as above.

In the above descriptions, "being formed by comprising an activator contained in a compound" means being formed by substituting a part of one or more elements selected from $M^1$, $M^2$, and $M^3$ constituting the compound with an activator. As mentioned above, in the present invention, an activator is contained in the compound thereby to form a phosphor. In addition, in the phosphor of the present invention, it is preferable that a portion of $M^1$ constituting the compound is substituted by an activator.

In the present invention, an activator can be selected from the group of rare earth elements and transition metal elements, and an element to be an activator may be selected from among them. From the standpoint of enhancing light emission luminance furthermore, among them, an activator consists of, preferably one or more elements selected from Eu, Tb, Ce and Mn, and more preferably Eu. In addition, when an activator consists of one or more elements selected from Eu, Tb, Ce and Mn, a portion of these elements may be substituted (coactivated) by one or more elements selected from the group consisting of Al, Y, La, Gd, Pr, Nd, Sm, Dy, Ho, Er, and Bi.

Furthermore, the phosphor of the present invention is represented by the formula, $M^1_{5(1-z)}Eu_zM^2M^3_3O_{12}$, wherein $M^1$, $M^2$, and $M^3$ have the same meanings as above, and z is a value in the range of 0.0001 to 0.3, preferably 0.01 to 0.1. In the phosphor, the activator is Eu.

In the present invention, $M^1$ denotes one or more elements selected from the group consisting of Ca, Sr and Ba, and preferably contains at least Ca.

In the present invention, $M^2$ denotes Mg and/or Zn. From the standpoint of easiness of using a starting material, preferable is Mg.

In the present invention, $M^3$ denotes Si and/or Ge. From the standpoint of availability of a starting material, preferable is Si.

In addition, preferably the phosphor of the present invention has the same type of crystal structure as that of Bredigite, and thereby becomes possible to exhibit further higher light emission luminance.

Next, a process for producing the phosphor of the present invention is explained. The phosphor of the present invention can be produced by firing a metal compound mixture having a composition that can become the phosphor of the present invention by the firing. Specifically, it can be produced by weighing respective compounds containing the corresponding metal elements ($M^1$, $M^2$, $M^3$, and an activator) so as to give a desired composition, mixing them and then firing the resultant metal compound mixture.

As the above compounds containing the corresponding metal elements, there can be used, for example, oxides, or compounds that can become oxides by decomposition and/or oxidation at a high temperature, such as hydroxides, carbonates, nitrates, halides, oxalates, phosphates, and the like.

By using a suitable amount of a halide such as fluoride or chloride as the above compounds containing metal elements, it is possible to control crystallinity of the resulting phosphor and the mean particle size of particles constituting the phosphor. In this case, the halide sometimes fulfills the role as a reaction accelerator (flux). A flux includes, for example, halides such as $MgF_2$, $CaF_2$, $SrF_2$, $BaF_2$, $MgCl_2$, $CaCl_2$, $SrCl_2$, $BaCl_2$, $MgI_2$, $CaI_2$, $SrI_2$, $BaI_2$, and the like; ammonium salts such as $NH_4Cl$, $NH_4I$, and the like; and boron compounds such as $B_2O_3$, $H_3BO_3$, and the like. These can be used as a starting material for a metal compound mixture or by adding them in a suitable amount to the metal compound mixture.

For example, the phosphor having a molar ratio of Ba:Mg:Si:Eu of 4.99:1:3:0.01, which is one of preferable phosphors in the present invention, can be produced by weighing $BaCO_3$, MgO, $SiO_2$, and $Eu_2O_3$ so as to give a molar ratio of Ba:Mg:Si:Eu of 4.99:1:3:0.01, mixing them and firing the resultant metal compound mixture.

For the above mixing, there can be used an apparatus, which is usually used industrially, for example, a ball mill, a V-shaped mixer, a stirrer, or the like. In addition, either wet type mixing or dry type mixing may be used. Furthermore, it may be carried out through crystallization step.

The phosphor of the present invention can be obtained by holding and firing the above metal compound mixture, for example, in the temperature range of 600° C. to 1600° C. and in the time range of 0.3 hour to 100 hours, depending on its composition. The above holding temperature at the time of firing is preferably 1100° C. to 1400° C.

An atmosphere at the time of firing includes, for example, an inert gas atmosphere such as nitrogen, argon, or the like; an oxidizing atmosphere such as air, oxygen, oxygen-containing nitrogen, oxygen-containing argon, or the like; a reducing atmosphere such as nitrogen containing 0.1 to 10 volume % of hydrogen, argon containing 0.1 to 10 volume % of hydrogen, or the like. In addition, when firing is carried out with a further strongly reducing atmosphere, for example, a technique of incorporating a suitable amount of carbon in a metal compound mixture and firing the resultant mixture may be freely used.

Furthermore, it is possible to hold a metal compound mixture at a temperature less than the holding temperature at the time of firing and carry out calcination thereby to produce the corresponding oxides or remove water of crystallization before the above firing, and thereafter carry out the above firing. Calcination may be carried out in any atmosphere of an inert gas atmosphere, an oxidizing atmosphere, or a reducing atmosphere. In addition, grinding may be carried out after calcination. Furthermore, an atmosphere at the time of calcination may be either of an oxidizing atmosphere such as air or a reducing atmosphere.

In addition, the phosphor obtained by the above process can be ground by use of, for example, a ball mill, a jet mill, or the like. Furthermore, washing and classification can be carried out. Moreover, grinding and firing can be carried out two or more times. In addition, particle surfaces of the phosphor may be subjected to surface treatment such as coating with a surface modification material. A surface modification material includes inorganic substances containing Si, Al, Ti, La, Y, or the like.

The phosphor of the present invention obtained as mentioned above, can exhibit higher light emission luminance, and is preferable for light-emitting devices, particularly for vacuum ultraviolet ray-excited light-emitting devices, and for near-ultraviolet ray-excited light-emitting devices.

Next, a phosphor paste having the phosphor of the present invention is explained.

The phosphor paste of the present invention contains as main components the phosphor of the present invention and organic substances. The organic substances include a solvent, a binder, and the like. The phosphor paste of the present invention can be used similarly to phosphor pastes, which is used in the production of the conventional light-emitting devices. That is, the organic substances in the phosphor paste can be removed by volatilization, combustion, decomposition, or the like through heat treatment to obtain a phosphor layer consisting substantially of the phosphor of the present invention.

The phosphor paste of the present invention can be produced by the publicly known process as disclosed in, for example, JP-A-10-255671, for example, can be obtained by mixing the phosphor of the present invention, a binder, and a solvent by use of a ball mill, a three roll mill, or the like. In addition, the phosphor paste of the present invention may contain a phosphor other than the phosphor of the present invention.

The above binder includes cellulosic resins (ethyl cellulose, methyl cellulose, nitrocellulose, acetyl cellulose, cellulose propionate, hydroxypropyl cellulose, butyl cellulose, benzyl cellulose, modified cellulose, and the like), acrylic resins (polymers of at least one of monomers such as acrylic acid, methacrylic acid, methyl acrylate, methyl mathacrylate, ethyl acrylate, ethyl mathacrylate, propyl acrylate, propyl mathacrylate, isopropyl acrylate, isopropyl mathacrylate, n-butyl acrylate, n-butyl mathacrylate, tert-butyl acrylate, tert-butyl mathacrylate, 2-hydroxyethyl acrylate, 2-hydroxyethyl mathacrylate, 2-hydroxypropyl acrylate, 2-hydroxypropyl mathacrylate, benzyl acrylate, benzyl mathacrylate, phenoxy acrylate, phenoxy mathacrylate, isobornyl acrylate, isobornyl mathacrylate, glycidyl mathacrylate, styrene, α-methyl styrene, acrylamide, methacrylamide, acrylonitrile, methacrylonitrile and the like), ethylene-vinyl acetate copolymer resin, polyvinyl butyral, polyvinyl alcohol, polypropylene glycol, polyethylene oxide, urethane resins, melamine resins, phenol resins, and the like.

In addition, the above solvent includes, for example, monohydric alcohols having a high boiling point; polyhydric alcohols such as diols and triols represented by ethylene glycol and glycerine; compounds wherein alcohols are etherified and/or esterified (ethylene glycol monoalkyl ethers, ethylene glycol dialkyl ethers, ethylene glycol alkyl ether acetates, diethylene glycol monoalkyl ether acetates, diethylene glycol dialkyl ethers, propylene glycol monoalkyl ethers, propylene glycol dialkyl ethers, propylene glycol alkyl ether acetates); and the like.

A phosphor layer, which is obtained by coating the phosphor paste obtained as mentioned above, on a substrate and then heat-treating it, also has a high luminescence intensity similarly to the phosphor. The material of the substrate may be glass substrate, resin film, or the like, and the shape of the substrate may be in the state of a plate, or in the state of a vessel, or may be flexible. In addition, a method for coating includes screen printing method, ink jet method, or the like. In addition, the temperature for heat treatment is usually 300° C. to 600° C. Furthermore, before carrying out heat treatment after coating on a substrate, drying may be carried out at a temperature of from room temperature to 300° C.

In addition, the light-emitting device of the present invention has the above phosphor. A light-emitting device usually has a phosphor and the excitation source thereof, and as needed, another phosphor. With regard to another phosphor, a red light-emitting phosphor includes trivalent europium-activated yttrium oxide phosphor ($Y_2O_3$:Eu), trivalent europium-activated yttrium oxysulfide phosphor ($Y_2O_2S$:Eu), or the like; a green light-emitting phosphor includes cerium, terbium-activated lanthanum phosphate ($LaPO_4$:Ce, Tb), terbium-activated cerium.terbium.magnesium.aluminum phosphor ($(Ce,Tb)MgAl_{11}O_{19}$:Tb), manganese-activated zinc silicate phosphor ($Zn_2SiO_4$:Mn), or the like; and a blue light-emitting phosphor includes europium-activated strontium phosphate phosphor ($Sr_5(PO_4)_3Cl$:Eu), europium-activated strontium.barium.calcium phosphate phosphor ($(Sr,Ca,Ba)_5(PO_4)_3Cl$:Eu), europium-activated barium.magnesium.aluminum phosphor ($BaMg_2Al_{16}O_{27}$:Eu, $BaMgAl_{10}O_{17}$:Eu, or the like), silicate phosphor ($(Sr,Ca,Ba)MgSi_2O_6$:Eu, $(Sr,Ca,Ba)_3MgSi_2O_8$:Eu, or the like), or the like.

Herein, as an example of light-emitting devices having the phosphor of the present invention, a three band fluorescent lamp, which is an ultraviolet ray-excited light-emitting device, is cited, and a process for the production thereof is explained. As a process for the production of a three band fluorescent lamp, there can be used the publicly known process as disclosed in, for example, JP-A-2004-2569. That is, three band light-emitting phosphors wherein blue light-emitting phosphor, green light-emitting phosphor, and red light-emitting phosphor are suitably mixed so as to emit the desired white light, are dispersed in, for example, a polyethylene oxide aqueous solution or the like to prepare a phosphor paste. This phosphor paste is coated on the inner surface of a glass bulb and then is subjected to baking in the temperature range of, for example, 400° C. to 900° C. to form a fluorescent film. Thereafter, a three band fluorescent lamp can be produced through the usual steps such as sealing of a stem to the glass bulb end, evacuation of air in the bulb, filling of mercury and a rare gas, cutting and sealing of an air release pipe, mounting of a base, and the like.

Next, a process for producing light-emitting devices having the phosphor of the present invention is explained with reference to a plasma display panel, which is a vacuum ultraviolet ray-excited light-emitting device. As a process for the production of a plasma display panel, there can be used the publicly known process as disclosed in, for example, JP-A-10-195428. That is, respective phosphors constituted by green light-emitting phosphor, red light-emitting phosphor, and blue light-emitting phosphor, are mixed with a binder consisting of, for example, a cellulosic resin and/or polyvinyl alcohol and a solvent to prepare phosphor pastes. The phosphor pastes are coated on the striped substrate surface, which is comparted with partition walls and provided with address electrodes, and on the surfaces of the partition walls, on the inner surface of the rear face substrate, by a method such as screen printing, and is heat-treated in the temperature range of 300 to 600° C. to obtain the respective phosphor layers. Thereon is superposed a front face glass substrate, which is mounted with transparent electrodes and bus electrodes in the orthogonal direction to the phosphor layers and is provided with a dielectric layer and a protective layer on the inner surface, and they are bonded with each other. A plasma display panel can be produced by evacuating air from the inside thereof, filling therein a rare gas such as Xe or Ne under a low pressure, and forming a discharge space.

Next, as an example of light-emitting devices having the phosphor of the present invention, a field emission display, which is an electron ray-excited light-emitting device, is cited, and a process for the production thereof is explained. As a process for the production of a field emission display, there can be used the publicly known process as disclosed in, for example, JP-A-2002-138279. That is, respective phosphors constituted by green light-emitting phosphor, red light-emitting phosphor, and blue light-emitting phosphor, are respectively dispersed in, for example, a polyvinyl alcohol aqueous solution or the like to prepare a phosphor paste. The phosphor pastes are coated on a glass substrate and then is heat-treated thereby to obtain a phosphor layer, which is used as a face plate. A field emission display can be produced through the usual steps such as combining the face plate and a rear plate having many electron-emitting devices together with a supporting frame, and at once hermetically sealing the gap among them while evacuating air from the gap, and the like.

Next, a process for producing light-emitting devices having the phosphor of the present invention is explained with reference to a white LED, which is a near-ultraviolet ray-excited light-emitting device. As a process for the production of a white LED, there can be used the publicly known process as disclosed in, for example, JP-A-5-152609 and JP-A-7-99345. That is, a white LED can be produced by dispersing phosphors containing at least the phosphor of the present invention in a translucent resin such as an epoxy resin, a polycarbonate, a silicone rubber, or the like, and molding the resin wherein the phosphors are dispersed, so as to surround a blue LED or an ultraviolet LED. In addition, when the phosphor of the present invention is a blue light-emitting phosphor, publicly known red light-emitting phosphor and green light-emitting phosphor may be dispersed together with the blue light-emitting phosphor of the present invention in the resin. The red light-emitting phosphor includes (Y,La,Gd, Lu)$_2$O$_2$S:Eu, and the green light-emitting phosphor includes BaMgAl$_{10}$O$_{17}$:Eu,Mn.

Furthermore, a white LED can be produced without dispersing phosphors in a translucent resin. That is, a white LED can be produced also by molding a translucent resin, which contains no phosphor, so as to surround a near-ultraviolet LED, and forming a phosphor layer on the surface thereof. In this connection, the surface of the phosphor layer may be covered with a further translucent resin. The phosphor layer can be formed, for example, by coating the above phosphor paste on the surface of a translucent resin.

EXAMPLES

Next, the present invention is explained in more detail by way of Examples, but the present invention should not be limited by these Examples.

Measurement of light emission luminance by ultraviolet ray excitation was carried out by irradiating near-ultraviolet rays (400 nm) at a phosphor in the atmosphere by use of a fluorescence spectrophotometer (FP6500 manufactured by JASCO Corporation).

Measurement of light emission luminance by vacuum ultraviolet ray excitation was carried out by placing a phosphor in a vacuum chamber, holding it at a vacuum of not more than 6.7 Pa ($5 \times 10^{-2}$ torr), and irradiating vacuum ultraviolet rays at the phosphor by use of an excimer 146 nm lamp (H0012 type manufactured by USHIO INC or an excimer 172 nm lamp (H0016 type manufactured by USHIO INC.). In addition, for measurement of luminance was used a spectroradiometer (SR-3 manufactured by TOPCON CORPORATION).

The powder X-ray diffraction pattern of a phosphor was measured by powder X-ray diffractometry using the characteristic X-rays of CuKα. As the measuring apparatus thereof was used a RINT2500TTR type X-ray diffraction measuring apparatus manufactured by Rigaku Corporation.

COMPARATIVE EXAMPLE 1

Calcium carbonate, CaCO$_3$ manufactured by Wako Pure Chemical Industries, Ltd., europium oxide, Eu$_2$O$_3$ manufactured by Shin-Etsu Chemical Co., Ltd., basic magnesium carbonate, (MgCO$_3$)$_4$Mg(OH)$_2$.5H$_2$O manufactured by Wako Pure Chemical Industries, Ltd., and silicon oxide, SiO$_2$ manufactured by Wako Pure Chemical Industries, Ltd., which were used as starting materials, were formulated and mixed so as to give a molar ratio of Ca:Eu:Mg:Si of 0.95:0.05:1:2 thereby to obtain a metal compound mixture, which was thereafter subjected to firing for two hours at a temperature of 1200° C. in the atmosphere of Ar containing 2 volume % of H$_2$. Thus, there was obtained a phosphor represented by the formula, Ca$_{0.95}$Eu$_{0.05}$MgSi$_2$O$_6$. When near-ultraviolet rays of 400 nm were irradiated at the resultant phosphor, blue light was emitted and the luminance thereof was indicated as 100. (In this connection, as the luminance was used the Y value indicated by the fluorescence spectrophotometer.) Furthermore, when vacuum ultraviolet rays by a 146 nm lamp were irradiated at this phosphor, blue light was emitted and indicated a luminance of 12 cd/m$^2$. Moreover, when vacuum ultraviolet rays by a 172 nm lamp were irradiated at this phosphor, blue light was emitted and indicated a luminance of 5 cd/m$^2$.

Example 1

Figure 2:
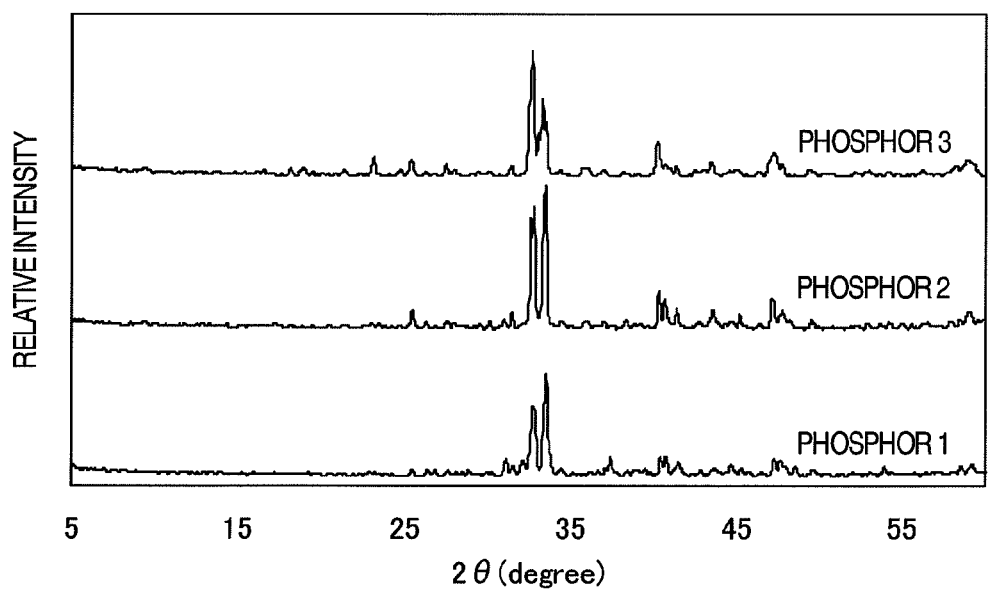
FIG. 2 Powder X-ray diffraction patterns in phosphor 1, phosphor 2 and phosphor 3.

Calcium carbonate, CaCO$_3$ manufactured by Wako Pure Chemical Industries, Ltd., europium oxide, Eu$_2$O$_3$ manufactured by Shin-Etsu Chemical Co., Ltd., basic magnesium carbonate, (MgCO$_3$)$_4$Mg(OH)$_2$.5H$_2$O manufactured by Wako Pure Chemical Industries, Ltd., and silicon oxide, SiO$_2$ manufactured by Wako Pure Chemical Industries, Ltd., which were used as starting materials, were formulated and mixed so as to give a molar ratio of Ca:Eu:Mg:Si of 4.95:0.05:1:3 thereby to obtain a metal compound mixture, which was thereafter subjected to firing for two hours at a temperature of 1300° C. in the atmosphere of Ar containing 2 volume % of H$_2$. Thus, there was obtained phosphor 1 represented by the formula, Ca$_{4.95}$Eu$_{0.05}$MgSi$_3$O$_{12}$. When near-ultraviolet rays of 400 nm were irradiated at the resultant phosphor 1, green light was emitted and the luminance thereof was 473 as compared with that of Comparative Example 1 indicated as 100. The emission spectrum obtained at the time is shown in FIG. 1. Furthermore, when vacuum ultraviolet rays by a 146 nm lamp were irradiated at this phosphor 1, green light was emitted and indicated a luminance of 62 cd/m$^2$. Moreover, when vacuum ultraviolet rays by a 172 nm lamp were irradiated at this phosphor 1, green light was emitted and indicated a luminance of 102 cd/m$^2$. Furthermore, when the crystal structure of phosphor 1 was examined by carrying out powder X-ray diffraction measurement (The result is shown in FIG. 2.), it was found that phosphor 1 has the same type of crystal structure as Bredigite.

Example 2

Calcium carbonate, CaCO$_3$ manufactured by Wako Pure Chemical Industries, Ltd., strontium carbonate, SrCO$_3$ manufactured by Wako Pure Chemical Industries, Ltd., europium oxide, Eu$_2$O$_3$ manufactured by Shin-Etsu Chemical Co., Ltd., basic magnesium carbonate, (MgCO$_3$)$_4$Mg(OH)$_2$.5H$_2$O manufactured by Wako Pure Chemical Industries, Ltd., and silicon oxide, SiO$_2$ manufactured by Wako Pure Chemical Industries, Ltd., which were used as starting materials, were formulated and mixed so as to give a molar ratio of Ca:Sr:Eu:Mg:Si of 4.45:0.5:0.05:1:3 thereby to obtain a metal compound mixture, which was thereafter subjected to firing for two hours at a temperature of 1300° C. in the atmosphere of Ar containing 2 volume % of H$_2$. Thus, there was obtained phosphor 2 represented by the formula, Ca$_{4.45}$Sr$_{0.5}$Eu$_{0.05}$MgSi$_3$O$_{12}$. When near-ultraviolet rays of 400 nm were irradiated at the resultant phosphor 2, green light was emitted and indicated a luminance of 66 cd/m$^2$. The luminance was 440 as compared with that of Comparative Example 1 indicated as 100. The emission spectrum obtained at the time is shown in FIG. 1. Furthermore, when vacuum ultraviolet rays by a 146 nm lamp were irradiated at this phosphor 2, green light was emitted and indicated a luminance of 55 cd/m$^2$. Moreover, when vacuum ultraviolet rays by a 172 nm lamp were irradiated at this phosphor 2, green light was emitted and indicated a luminance of 91 cd/m$^2$. Furthermore, when the crystal structure of phosphor 2 was examined by carrying out powder X-ray diffraction measurement (The result is shown in FIG. 2.), it was found that phosphor 2 has the same type of crystal structure as Bredigite.

Example 3

Calcium carbonate, $CaCO_3$ manufactured by Wako Pure Chemical Industries, Ltd., barium carbonate, $BaCO_3$ manufactured by Wako Pure Chemical Industries, Ltd., europium oxide, $Eu_2O_3$ manufactured by Shin-Etsu Chemical Co., Ltd., basic magnesium carbonate, $(MgCO_3)_4Mg(OH)_2 \cdot 5H_2O$ manufactured by Wako Pure Chemical Industries, Ltd., and silicon oxide, $SiO_2$ manufactured by Wako Pure Chemical Industries, Ltd., which were used as starting materials, were formulated and mixed so as to give a molar ratio of Ca:Ba:Eu:Mg:Si of 4.45:0.5:0.05:1:3, and thereafter were subjected to firing for two hours at a temperature of 1300° C. in the atmosphere of Ar containing 2 volume % of $H_2$. Thus, there was obtained phosphor 3 represented by the formula, $Ca_{4.45}Ba_{0.5}Eu_{0.05}MgSi_3O_{12}$. When near-ultraviolet rays of 400 nm were irradiated at the resultant phosphor 3, blue light was emitted and the luminance thereof was 220 as compared with that of Comparative Example 1 indicated as 100. The emission spectrum obtained at the time is shown in FIG. 1. Furthermore, when vacuum ultraviolet rays by a 146 nm lamp were irradiated at this phosphor 3, blue light was emitted and indicated a luminance of 23 $cd/m^2$. Moreover, when vacuum ultraviolet rays by a 172 nm lamp were irradiated at this phosphor 3, blue light was emitted and indicated a luminance of 50 $cd/m^2$. Furthermore, when the crystal structure of phosphor 3 was examined by carrying out powder X-ray diffraction measurement (The result is shown in FIG. 2.), it was found that phosphor 3 has the same type of crystal structure as Bredigite.

The invention claimed is:

1. A phosphor comprising:
   a compound represented by the formula, $xM^1O \cdot M^2O \cdot yM^3O_2$, wherein $M^1$ denotes one or more elements selected from the group consisting of Ca, Sr and Ba, $M^2$ denotes Mg and/or Zn, $M^3$ denotes Si and/or Ge, x is a value in the range of 4 to 6, and y is a value in the range of 2 to 4; and
   an activator contained in the compound.

2. The phosphor according to claim 1, wherein the activator is Eu.

3. The phosphor according to claim 1, which has the same type of crystal structure as that of Bredigite.

4. A phosphor paste having the phosphor according to claim 1.

5. A phosphor layer obtained by coating the phosphor paste according to claim 4 on a substrate, and then heat-treating it.

6. A light-emitting device having the phosphor according to claim 1.

7. A phosphor comprising:
   a compound represented by the formula, $M^1{}_5M^2M^3{}_3O_{12}$, wherein $M^1$ denotes one or more elements selected from the group consisting of Ca, Sr and Ba, $M^2$ denotes Mg and/or Zn, and $M^3$ denotes Si and/or Ge; and
   an activator contained in the compound.

8. A phosphor represented by the formula, $M^1{}_{5(-z)}Eu_zM^2M^3{}_3O_{12}$, wherein $M^1$ denotes one or more selected from the group consisting of Ca, Sr and Ba, $M^2$ denotes Mg and/or Zn, $M^3$ denotes Si and/or Ge, and z is a value in the range of 0.0001 to 0.3.

* * * * *